(12) United States Patent
Creamer et al.

(10) Patent No.: US 9,549,025 B2
(45) Date of Patent: Jan. 17, 2017

(54) PROTOCOL OPTIMIZATION FOR CLIENT AND SERVER SYNCHRONIZATION

(75) Inventors: Thomas E Creamer, Boca Raton, FL (US); Curtis E Hrischuk, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 1737 days.

(21) Appl. No.: 11/382,288

(22) Filed: May 9, 2006

(65) Prior Publication Data

US 2007/0288548 A1 Dec. 13, 2007

(51) Int. Cl.
*H04L 29/08* (2006.01)
*G06F 13/42* (2006.01)
*H04L 7/00* (2006.01)

(52) U.S. Cl.
CPC .............................. *H04L 67/1095* (2013.01)

(58) Field of Classification Search
CPC .. H04L 2209/80; H04L 67/1095; H04L 29/08; H04L 7/00; G06F 13/42
See application file for complete search history.

(56) References Cited

U.S. PATENT DOCUMENTS

| | | | | |
|---|---|---|---|---|
| 5,640,556 A * | 6/1997 | Tamura | ............. | G06F 17/30067 |
| 5,729,735 A * | 3/1998 | Meyering | ........... | G06F 11/1451 |
| 5,978,813 A * | 11/1999 | Foltz | ................. | G06F 17/30067 |
| 6,266,669 B1 * | 7/2001 | Brodersen | ......... | G06F 17/30584 |
| 6,516,337 B1 * | 2/2003 | Tripp et al. | ................... | 709/202 |
| 6,643,669 B1 * | 11/2003 | Novak et al. | ................. | 707/201 |
| 7,035,847 B2 * | 4/2006 | Brown et al. | ..................... | 707/4 |
| 7,054,891 B2 * | 5/2006 | Cole | ............................. | 707/201 |
| 7,069,433 B1 * | 6/2006 | Henry | .................... | G06Q 40/00 380/270 |
| 7,222,139 B2 * | 5/2007 | Mau | ...................... | G06Q 30/06 707/622 |
| 7,353,272 B2 * | 4/2008 | Robertson et al. | ........... | 709/224 |
| 7,359,985 B2 * | 4/2008 | Grove et al. | .................. | 709/238 |
| 7,363,327 B2 * | 4/2008 | Bali et al. | ..................... | 707/201 |
| 7,457,877 B1 * | 11/2008 | Shah et al. | .................... | 709/226 |
| 7,519,702 B1 * | 4/2009 | Allan | ............................ | 709/224 |
| 7,536,453 B2 * | 5/2009 | Fingerhut et al. | ............ | 709/223 |
| 7,676,570 B2 * | 3/2010 | Levy et al. | ................... | 709/224 |

(Continued)

FOREIGN PATENT DOCUMENTS

CN 1368721 A 9/2002

*Primary Examiner* — Sargon Nano
(74) *Attorney, Agent, or Firm* — Steven M. Greenberg, Esq.; CRGO Law

(57) ABSTRACT

Embodiments of the present invention address deficiencies of the art in respect to data synchronization and provide a method, system and computer program product for protocol optimization for client and server synchronization. In one embodiment a protocol optimization method for client and server synchronization can be provided. The method can include receiving server updates from a synchronization server, and applying each update to a client data store in parallel to requesting additional ones of the server updates from the synchronization server before completing the application to the client data store. In one aspect of the embodiment, receiving server updates from a synchronization server can include receiving server update subsets of a singular server update for a synchronization conversation from a synchronization server.

18 Claims, 2 Drawing Sheets

(56) References Cited

U.S. PATENT DOCUMENTS

| | | | |
|---|---|---|---|
| 2001/0050903 A1* | 12/2001 | Vanlint | 370/252 |
| 2002/0032489 A1* | 3/2002 | Tynan | G06F 17/30097 |
| | | | 700/1 |
| 2002/0073099 A1* | 6/2002 | Gilbert | G06F 17/3061 |
| 2002/0112049 A1* | 8/2002 | Elnozahy et al. | 709/224 |
| 2003/0191781 A1* | 10/2003 | Civanlar et al. | 707/200 |
| 2003/0229644 A1* | 12/2003 | Natarajan et al. | 707/102 |
| 2004/0025072 A1* | 2/2004 | Mau | G06Q 30/06 |
| | | | 713/400 |
| 2005/0210459 A1* | 9/2005 | Henderson et al. | 717/168 |
| 2007/0073873 A1* | 3/2007 | Levy et al. | 709/224 |
| 2010/0199257 A1* | 8/2010 | Biggerstaff | G06F 8/76 |
| | | | 717/104 |

* cited by examiner

PROTOCOL OPTIMIZATION FOR CLIENT AND SERVER SYNCHRONIZATION

BACKGROUND OF THE INVENTION

Field of the Invention

The present invention relates to the field of data synchronization and more particularly to the use of a synchronization framework to provide data synchronization services.

Description of the Related Art

Personal computers no longer are the most common vehicle through which users connect to data communications networks like the Internet. Now that computing can be viewed as being truly everywhere, computer scientists and information technologists have begun to rethink those services that can be provided to meet the needs of mobile computing users. In consequence, the study of pervasive computing has resulted in substantial innovation in the field of network connectivity. "Pervasive computing" has been defined as referring to any non-constrained computing device not physically tethered to a data communications network. Thus, pervasive computing devices refer not only to computers wirelessly linked to networks, but also to handheld computing devices, wearable systems, embedded computing systems and the like.

Most pervasive devices, including notebook computers, handheld computers and even data enabled cellular telephones permit data synchronization with a different computing device, for example a desktop computer. Data synchronization refers to the harmonization of data between two data sources such that the data contained in each data source can be reconciled notwithstanding changes to the data applied in either or both of the data sources. Modern pervasive devices provide for a synchronization process through a direct cable link, a modem link, or a network link to a host computing device. Wireless pervasive devices further can accommodate synchronization over infrared or radio frequency links.

To facilitate the synchronization of disparate devices hosting different applications, synchronization frameworks like the framework specified by "SyncML" have been proposed. Generally, a synchronization framework defines an interoperable protocol for data synchronization between heterogeneous data stores on pervasive devices and connected servers. Such synchronization frameworks further define the message exchange between client and server to accomplish synchronization. Yet, by design, synchronization frameworks do not specify the actual process required to accomplish synchronization.

Contemporary protocol synchronization frameworks facilitate the harmonization of data in the data stores of a local and host device over a communications medium such as a wireless link. In the ordinary course of synchronization, a client device retrieves data updates since a last synchronization from the local data store and provides those updates to the host device. The host device applies the updates to the host data store and provides updates since the last synchronization from the host data store to the client device. To identify updated data, the host device relies upon local identifiers previously provided by the client device.

The client, upon receipt of the host updates, iterates through each update applying the same to the local data store. Only once all updates have been applied locally, will the client device provide updated mapping information to the host device in order to facilitate subsequent synchronizations. As such, it will be recognized by the skilled artisan that the serial nature of client side updates and the heavy reliance upon providing a local identifier mapping can render contemporary synchronization protocols susceptible to failure conditions and slow responsiveness. Additionally, the skilled artisan will recognize that processing in the client device can be slow compared to processing in the server and the network link further can inhibit the speed of synchronization.

Specifically, where the communications link becomes interrupted mid-synchronization, all progress will be lost. Moreover, in as much as the client device must await the completion of the update process in the local data store before forwarding the local identifier mapping to the host device, substantial delays can be incurred where the update process is slow due to the nature of an applicable pervasive device. Finally, contemporary synchronization protocols fail to account for the reality of traffic transfer with the bulk of the update traffic in a synchronization process stemming from the host device rather than the client device.

BRIEF SUMMARY OF THE INVENTION

Embodiments of the present invention address deficiencies of the art in respect to data synchronization and provide a novel and non-obvious method, system and apparatus for a protocol optimization for client and server synchronization. In one embodiment an optimized synchronization protocol enabled data processing system can be provided. The system can include a synchronization client configured for communicative coupling to a synchronization server for a common application over a communications medium, a data store of data for the common application, and a data store agent coupled to each of the synchronization client and the data store.

The agent can include program code enabled to process updates to the data store for the common application on behalf of the synchronization client in parallel with the synchronization client exchanging communications with the synchronization server as part of a synchronization conversation. For instance, the updates can be subsets of a single server update for the synchronization conversation. The agent further can include additional program code enabled to assign pre-allocated temporary local identifiers to local objects associated with the subsets and to provide the assigned pre-allocated temporary local identifiers to the synchronization server responsive to receiving the subsets from the synchronization server.

In another embodiment of the invention, a protocol optimization method for client and server synchronization can be provided. The method can include receiving server updates from a synchronization server, and applying each update to a client data store in parallel to requesting additional ones of the server updates from the synchronization server before completing the application to the client data store. In one aspect of the embodiment, receiving server updates from a synchronization server can include receiving server update subsets of a singular server update for a synchronization conversation from a synchronization server.

In another aspect of the embodiment, the method further can include pre-allocating temporary local identifiers for assignment to local objects associated with incoming ones of the server update subsets, providing a mapping of the pre-allocated temporary local identifiers corresponding to the local objects to the synchronization server, and providing an updated mapping to the synchronization server when all of the server update subsets of the singular server update have been received and applied to the client data store. As such, when an interruption in the synchronization conversation is detected, the synchronization conversation can be resumed at a point proximate to a last processed server update subset.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for protocol optimized data synchronization. In accordance with an embodiment of the present invention, server updates to a client during data synchronization for a common application can be stored in a client data store in parallel to the retrieval of server update blocks. Furthermore, a single server update to the client for a complete synchronization can be partitioned into multiple update exchanges of server update subsets between the client and the server. Finally, pre-allocated temporary local identifiers can be mapped to server side data objects during the course of data synchronization so that interruptions to the synchronization process can be resumed without requiring a restart of the synchronization process.

By performing server updates to the client in parallel to the retrieval of server update blocks, the slow, serialized process characteristic of conventional data synchronization protocols can be eliminated in favor of faster, parallel processing. Additionally, by partitioning a single server update to the client for a complete synchronization into multiple update exchanges of server update subsets between the client and the server, both performance and failure recovery goals can be met more readily. Finally, by pre-allocating temporary local identifiers for mapping to server side data objects during the course of data synchronization, interruptions to the synchronization process can be resumed without requiring a restart of the synchronization process.

Figure 1:
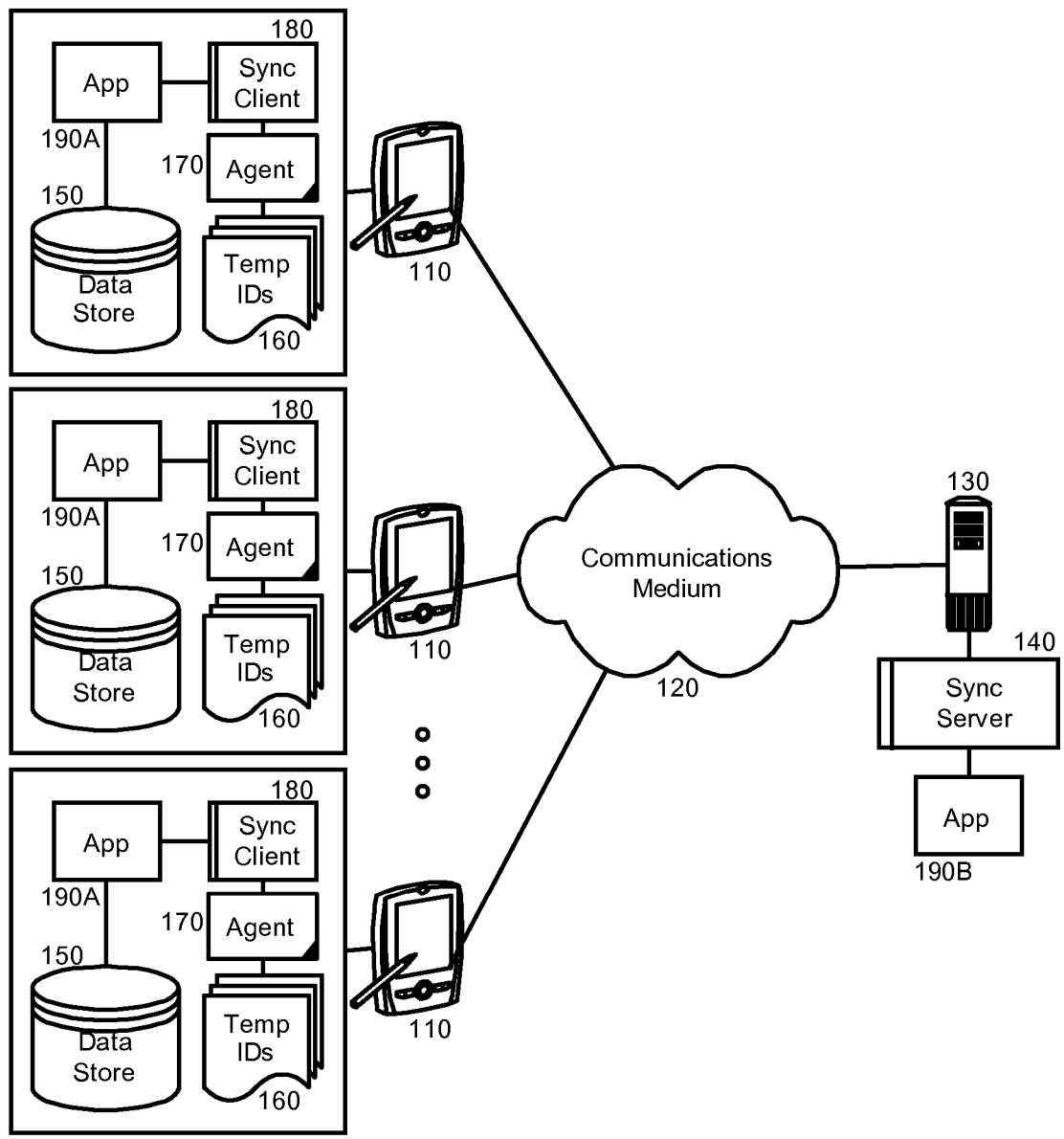
FIG. 1 is a schematic illustration of a data processing system enabled for protocol optimized data synchronization; and, FIG. 2 is an event diagram illustrating a process for protocol optimized data synchronization.

In more particular illustration of an exemplary embodiment of the invention, FIG. 1 is a schematic illustration of a data processing system enabled for protocol optimized data synchronization. The data processing system can include a host computing platform 130 coupled to one or more client computing platforms 110 over a computer communications medium 120, for example a wire bound or wireless data communications medium. Both the host computing platform 130 and each client computing platform 110 can support the operation of a common application 190A, 190B enabled for data synchronization according to a synchronization protocol.

To enable data synchronization for the common application 190A, 190B, a synchronization server 140 can be provided in the host computing platform 130, and a synchronization client 180 can be provided in each client computing platform 110. The synchronization client 180 and synchronization server 140 can be configured to negotiate and manage a data synchronization process for data in the common application 190A, 190B across the communications medium 120. Generally, data utilized by the common application 190A disposed in the client computing platform 110 can be stored in the data store 150.

Notably, a synchronization agent 170 can be disposed logically between the synchronization client 180 and the client data store 150 in that the synchronization agent 170 can manage updates to the client data store 150 on behalf of the client data store 150 without requiring the synchronization client 180 to directly communicate with the client data store 150. The synchronization agent 170 can include program code enabled to parallel process updates to the client data store 150 on behalf of the synchronization client 180 allowing the synchronization client 180 to return to communicating with the synchronization server 140. In this way, the synchronization client 180 need not wait for the successful completion of the update process to the data store 150 before resuming a synchronization conversation with the synchronization server 140.

Importantly, the program code of the synchronization agent 170 further can be enabled to process a single server update for the application 190A, 190B in multiple, partitioned sub-sets of the update. Furthermore, temporary local identifiers 160 for stored objects in the data store 150 can be provided for each of the partitioned sub-sets. In this regard, the program code can be enabled to pre-assign temporary local identifiers 160 to synchronized data in each of the sub-sets of the update. The temporary local identifiers 160 can be mapped to local objects in the host computing platform 130 without waiting for the update process in the data store 150 to complete for each sub-set of the update. Additionally, any interruption in the synchronization process can be cured by a simple resumption in the synchronization process beginning with the last processed sub-set of the update.

Figure 2:
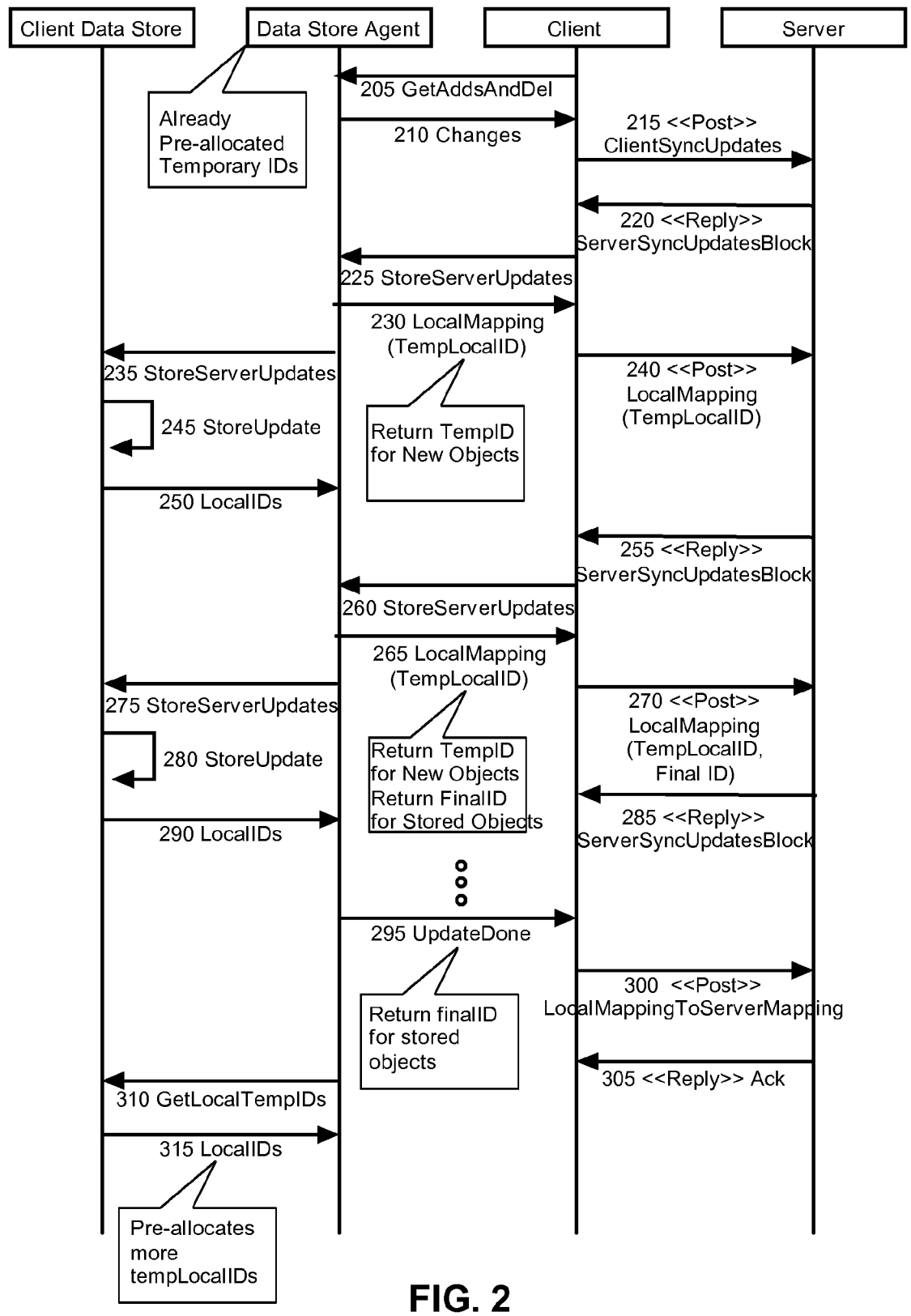

In more particular illustration, FIG. 2 is an event diagram illustrating a process for protocol optimized data synchronization. Beginning with path 205, the synchronization client can forward a request to the data store agent for changes to the client data store. In path 210, the data store agent can forward the changes to the synchronization client for synchronization with the synchronization server. In path 215, the synchronization client can post the changes to the synchronization server and in path 220, the synchronization server can reply to the synchronization client with a subset of a complete set of server updates for the synchronization conversation.

In path 225, the subset of server updates can be provided to the data store agent and the data store agent can respond in path 230 with a pre-allocated local mapping of temporary identifiers for the objects referenced in the subset of updates. Thereafter, the data store agent in path 235 can provide the subset of server updates to the client data store for storage. In path 245, the data store can process the storage of the subset of server updates and, when finished, in path 250 the data store can provide local identifiers for the subset of server updates to the data store agent. Thereafter, the synchronization server in path 255 can provide a new subset of server updates to the synchronization client for processing according to paths 225 through 250.

Specifically, in path 260 the subset of server updates can be provided to the data store agent and the data store agent can respond in path 265 with a pre-allocated local mapping of temporary identifiers for the objects referenced in the subset of updates. Additionally, the data store agent can respond in path 265 with a local mapping of final identifiers for the previously stored objects. Thereafter, the data store agent in path 275 can provide the subset of server updates to the client data store for storage and the server in path 270 can apply both the temporary and final mappings as the case may be. In path 280, the data store can process the storage of the subset of server updates and, when finished, in path 290 the data store can provide local identifiers for the subset of server updates to the data store agent.

This process can continue until all subsets of the server updates have completed to form a complete server update for the synchronization conversation. At the completion of the last subset of the server updates, in path 295 an update done message can be forwarded to the synchronization client. In response to the receipt of the update done message, in path 300, the synchronization client can post a local mapping of object identifiers to the synchronization server so that the synchronization server can have a true and correct mapping absent the temporary identifiers assigned previously. In path 305, the synchronization server can acknowledge the mapping. Thereafter, anticipating a new synchronization conversation, in path 310 a new set of temporary local identifiers can be requested of the client data store and the client data store can respond in path 315 by providing a set of pre-allocated temporary local identifiers to the data store agent.

Importantly, the process of updating the client data store can occur in a separate thread of execution from the thread of execution utilized by the synchronization client in conducting the synchronization conversation with the synchronization server. Consequently, the process of updating the data store can occur in parallel to the process of communicating with the synchronization server. Moreover, as the complete server update of the singular synchronization conversation can be partitioned into small subsets of server updates assigned to temporary local identifiers, a disruption in communications can be cured by resuming the synchronization conversation at the last set of stored temporary local identifier mappings.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain or store the program for use by or in connection with the instruction execution system, apparatus, or device. The medium can be an electronic, magnetic, optical, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A protocol optimization method for client and server synchronization, the method comprising:

executing in memory of a mobile device a mobile application coupled to a data store and also a synchronization client for the application and a synchronization agent that is separate from the synchronization client; and synchronizing the synchronization client and a synchronization server over a computer communications network, with the synchronization including:

posting, by the synchronization client to the synchronization server, changes to data objects in the data store, responsive to the posting of changes to data objects, receiving, by the synchronization client from the synchronization server, a reply including only a subset of a complete set of server updates to the data store, responsive to the receipt of the reply, providing, by the synchronization client and to the synchronization agent, the subset of the complete set of server updates, additionally receiving, by the synchronization client and from the synchronization server over the computer communications network, a different subset of the complete set of server updates to the data store, at least partially simultaneously with the additional receipt of the different data subset, updating, by the synchronization agent, the data store utilizing a pre-allocated local mapping of temporary identifiers for objects in the subset of the complete set of server updates, at least partially simultaneously with the additional receipt of the different data subset, returning, by the synchronization agent and to the synchronization client, final local identifiers for the objects in the subset of the complete set of server updates, and at least partially simultaneously with the additional receipt of the different data subset, returning, by the synchronization client to the synchronization server over the communications network, the final local identifiers for the objects in the subset of the complete set of server updates.

2. The method of claim 1, wherein the client notifies the server when all of the subsets of the complete set of server updates have been received and applied to the client data store by the agent.

3. The method of claim 1, wherein each subset of the complete set of server updates is applied by the agent to the data store in a parallel executing thread of execution while the client requests additional subsets from server in a separate parallel executing thread of execution.

4. The method of claim 1, wherein the pre-allocated local mapping of temporary identifiers for objects in the subset are pre-allocated, mapped to corresponding local objects in the data store and provided to the server prior to the initialization of the data synchronization.

5. The method of claim 4, wherein an updated mapping is provided by the client to the synchronization server when all of the subsets of the complete set of server updates have been received and applied to the client data store by the agent.

6. The method of claim 1, wherein the synchronization further comprises: detecting an interruption in the data synchronization; and, resuming synchronization at a point proximate to a last processed subset of the complete set of server updates.

7. A computer program product comprising a non-transitory computer usable medium having computer usable program code for protocol optimization for client and server synchronization, the computer program product including:
computer usable program code for initiating data synchronization between a synchronization client in a mobile computing device and a synchronization server over a computer communications network by posting, by the client to the server, changes to data objects in a data store of the mobile device; and
computer usable program code for synchronizing the synchronization client and a synchronization server over a computer communications network, with the synchronization including:
posting, by the synchronization client to the synchronization server, changes to data objects in the data store,
responsive to the posting of changes to data objects, receiving, by the synchronization client from the synchronization server, a reply including only a subset of a complete set of server updates to the data store,
responsive to the receipt of the reply, providing, by the synchronization client and to the synchronization agent, the subset of the complete set of server updates,
additionally receiving, by the synchronization client and from the synchronization server over the computer communications network, a different subset of the complete set of server updates to the data store, at least partially simultaneously with the additional receipt of the different data subset, updating, by the synchronization agent, the data store utilizing a pre-allocated local mapping of temporary identifiers for objects in the subset of the complete set of server updates,
at least partially simultaneously with the additional receipt of the different data subset, returning, by the synchronization agent and to the synchronization client, final local identifiers for the objects in the subset of the complete set of server updates, and
at least partially simultaneously with the additional receipt of the different data subset, returning, by the synchronization client to the synchronization server over the communications network, the final local identifiers for the objects in the subset of the complete set of server updates.

8. The computer program product of claim 6, wherein the client notifies the server when all of the subsets of the complete set of server updates have been received and applied to the client data store by the agent.

9. The computer program product of claim 6, wherein each subset of the complete set of server updates is applied by the agent to the data store in a parallel executing thread of execution while the client requests additional subsets from server in a separate parallel executing thread of execution.

10. The computer program product of claim 6, wherein the pre-allocated local mapping of temporary identifiers for objects in the subset are pre-allocated, mapped to corresponding local objects in the data store and provided to the server prior to the initialization of the data synchronization.

11. The computer program product of claim 9, wherein an updated mapping is provided by the client to the synchronization server when all of the subsets of the complete set of server updates have been received and applied to the client data store by the agent.

12. The computer program product of claim 6, wherein the synchronization further comprises:
detecting an interruption in the data synchronization; and, resuming synchronization at a point proximate to a last processed subset of the complete set of server updates.

13. An optimized synchronization protocol enabled data processing system comprising:
a mobile device comprising a processor and memory and a data store;
a mobile application executing in the memory of the mobile device and updating objects in the data store;
a synchronization client synchronizing updates to the objects in the data store received from a synchronization server from over a computer communications network;
and, a synchronization agent coupled to the client and executing in the memory of the mobile device, the client initiating data synchronization with the server over the computer communications network for synchronizing the synchronization client and a synchronization server over a computer communications network, with the synchronization including:
posting, by the synchronization client to the synchronization server, changes to data objects in the data store,
responsive to the posting of changes to data objects, receiving, by the synchronization client from the synchronization server, a reply including only a subset of a complete set of server updates to the data store,
responsive to the receipt of the reply, providing, by the synchronization client and to the synchronization agent, the subset of the complete set of server updates,
additionally receiving, by the synchronization client and from the synchronization server over the computer communications network, a different subset of the complete set of server updates to the data store,
at least partially simultaneously with the additional receipt of the different data subset, updating, by the synchronization agent, the data store utilizing a pre-allocated local mapping of temporary identifiers for objects in the subset of the complete set of server updates,
at least partially simultaneously with the additional receipt of the different data subset, returning, by the synchronization agent and to the synchronization client, final local identifiers for the objects in the subset of the complete set of server updates, and at least partially simultaneously with the additional receipt of the different data subset, returning, by the synchronization client to the synchronization server over the communications network, the final local identifiers for the objects in the subset of the complete set of server updates.

14. The system of claim 12, wherein the client notifies the server when all of the subsets of the complete set of server updates have been received and applied to the client data store by the agent.

15. The system of claim 12, wherein each subset of the complete set of server updates is applied by the agent to the data store in a parallel executing thread of execution while the client requests additional subsets from server in a separate parallel executing thread of execution.

16. The system of claim 12, wherein the pre-allocated local mapping of temporary identifiers for objects in the subset are pre-allocated, mapped to corresponding local objects in the data store and provided to the server prior to the initialization of the data synchronization.

17. The system of claim 15, wherein an updated mapping is provided by the client to the synchronization server when all of the subsets of the complete set of server updates have been received and applied to the client data store by the agent.

18. The system of claim 12, wherein the synchronization further comprises: detecting an interruption in the data synchronization; and, resuming synchronization at a point proximate to a last processed subset of the complete set of server updates.

* * * * *